US011884329B2

(12) United States Patent
Zalanka et al.

(10) Patent No.: US 11,884,329 B2
(45) Date of Patent: Jan. 30, 2024

(54) CONNECTOR FOR INTERCONNECTING FRAME MEMBERS OF A SPACE FRAME ASSEMBLY

(71) Applicant: Caterpillar Inc., Peoria, IL (US)

(72) Inventors: David Oliver Zalanka, Mt Zion, IL (US); Chad Michael Arnold, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 290 days.

(21) Appl. No.: 17/444,081

(22) Filed: Jul. 30, 2021

(65) Prior Publication Data
US 2023/0031824 A1  Feb. 2, 2023

(51) Int. Cl.
B62D 23/00 (2006.01)
B62D 21/02 (2006.01)
B62D 21/12 (2006.01)
E04B 1/19 (2006.01)

(52) U.S. Cl.
CPC ........... B62D 23/005 (2013.01); B62D 21/02 (2013.01); B62D 21/12 (2013.01); E04B 1/1909 (2013.01); B60Y 2200/142 (2013.01)

(58) Field of Classification Search
CPC ...... B62D 23/005; B62D 21/02; B62D 21/12; B62D 21/186; B62D 27/023; B62D 21/08; E04B 1/1909; B60Y 2200/142; B23K 37/053; B23K 2101/24; B23K 33/008; F16B 9/01; F16B 9/056; F16B 9/09
See application file for complete search history.

(56) References Cited

U.S. PATENT DOCUMENTS

| 2,614,827 A | * | 10/1952 | Peach | ..................... E04B 1/585 |
| | | | | 29/523 |
| 2,757,677 A | * | 8/1956 | Denn | ....................... B23K 1/00 |
| | | | | 135/160 |
| 3,425,182 A | * | 2/1969 | Owens | ..................... E04B 1/19 |
| | | | | 403/171 |
| 4,027,449 A | * | 6/1977 | Alcalde Cilveti | .... E04B 1/1906 |
| | | | | 403/171 |
| 4,283,156 A | * | 8/1981 | Harper, Jr. | ............ E04B 1/1903 |
| | | | | 52/81.3 |

(Continued)

FOREIGN PATENT DOCUMENTS

| EP | 1357017 A1 * | 10/2003 | ........... B62D 23/005 |
| FR | 2969249 | 6/2012 | |

OTHER PUBLICATIONS

Dogan, Vehicle Spaceframe, Oct. 29, 2003, EPO, EP 1357017 A1, Machine Translation of Description (Year: 2003).*

(Continued)

*Primary Examiner* — Paul N Dickson
*Assistant Examiner* — Matthew D Lee (57) ABSTRACT

A connector for connecting a frame member to one or more other frame members of a space frame assembly is disclosed. The connector includes a body defining a surface and a projection extending outwardly from the surface along a main axis to define an axial end surface away from the surface. The axial end surface defines a curvature having continuity across an expanse of the axial end surface to facilitate formation of a full penetration weld joint between an end of the frame member and the axial end surface upon a contact of the end of the frame member with the axial end surface.

2 Claims, 7 Drawing Sheets

(56) References Cited

U.S. PATENT DOCUMENTS

| | | | | |
|---|---|---|---|---|
| 4,660,345 A | * | 4/1987 | Browning | B62D 21/08 |
| | | | | 164/63 |
| 6,241,310 B1 | * | 6/2001 | Patelczyk | B62D 23/005 |
| | | | | 296/203.02 |
| 2014/0223745 A1 | * | 8/2014 | Eberhart | E04B 1/58 |
| | | | | 403/373 |
| 2016/0264189 A1 | * | 9/2016 | Gami | B23K 33/008 |
| 2020/0139492 A1 | * | 5/2020 | Arnold | B23K 33/006 |

OTHER PUBLICATIONS

Written Opinion and International Search Report for Int'l. Patent Appln. No. PCT/US2022/037531, dated Oct. 26, 2022 (11 pgs).

* cited by examiner

CONNECTOR FOR INTERCONNECTING FRAME MEMBERS OF A SPACE FRAME ASSEMBLY

TECHNICAL FIELD

The present disclosure relates to a space frame assembly employed in a chassis of a machine (e.g., a haul truck). More particularly, the present disclosure relates to a connector for connecting a frame member of the space frame assembly with one or more other frame members of the space frame assembly.

BACKGROUND

Space frame assemblies are commonly employed in chassis of machines, such as off-highway trucks. A space frame assembly is typically formed by assembling several frame members together. Frame members may be in the form of elongated solid or hollow struts and may be positioned at various angles with respect to each other during the assembly process. Also, two or more frame members may be joined together to define a frame junction. To form a frame junction, the frame members are typically coped and/or mated to fit with each other, and are joined together (e.g., by welding). The frame junction formed by using such joining methods may define relatively high stress concentration regions of the space frame assembly. Further, such joining methods may require specialized tooling and fixtures, which may add to the cost and the time to manufacture the space frame assembly. Furthermore, differently designed connectors may be required to be used at different frame junctions of the space frame assembly.

U.S. Publication No. 20200139492 discloses a system for improving alignment in welded assemblies. The system includes a support member having a surface and a projection extending from the surface. The projection may include one of a convex or a concave geometry. The system includes a positioning member provided over the support member for receiving a frame member. The positioning member may be movable over the support member, and the positioning member may include a geometry configured to engage the one of the convex or the concave geometry. The frame member may be movable from a first position relative to a center of the projection to a second position relative to the center of the projection during movement of the positioning member over the support member.

SUMMARY OF THE INVENTION

In an aspect, the present disclosure relates to a connector for connecting a frame member to one or more other frame members of a space frame assembly. The connector includes a body defining a surface and a projection extending outwardly from the surface along a main axis to define an axial end surface away from the surface. The axial end surface defines a curvature having continuity across an expanse of the axial end surface to facilitate formation of a full penetration weld joint between an end of the frame member and the axial end surface upon a contact of the end of the frame member with the axial end surface.

In another aspect, the present disclosure is directed to a space frame assembly for a machine. The space frame assembly includes a plurality of frame members and a connector to connect a frame member of the plurality of frame members to one or more other frame members of the plurality of frame members. The connector includes a body defining a surface and a projection extending outwardly from the surface along a main axis to define an axial end surface away from the surface. The axial end surface defines a curvature having continuity across an expanse of the axial end surface to facilitate formation of a full penetration weld joint between an end of the frame member and the axial end surface upon a contact of the end of the frame member with the axial end surface.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
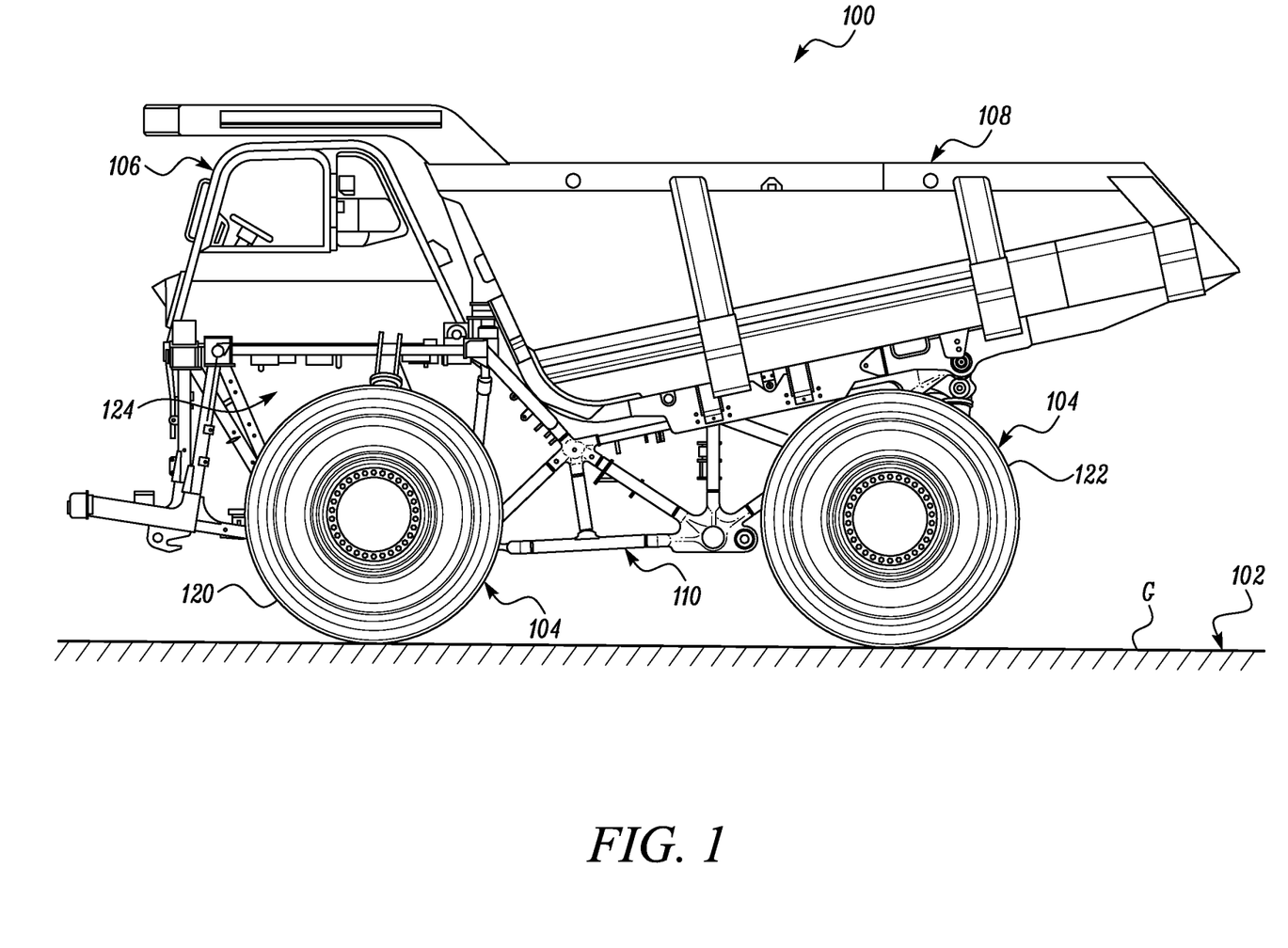
FIG. 1 illustrates an exemplary machine with one or more outer panels removed to show a space frame assembly of the machine, in accordance with an embodiment of the present disclosure.

Referring to FIG. 1 an exemplary machine 100 is shown. The machine 100 may operate at a worksite 102 that may include one or more of a mine site, a landfill, a quarry, a construction site, or any other type of worksite. The machine 100 may be a haul truck, although one or more aspects of the present disclosure may be applied to other machines, such as off-highway trucks, articulated trucks, dump trucks, loaders, excavators, and/or the like. Further, the machine 100 may be a manned machine or an unmanned machine. One or more outer panels of the machine 100 are removed from the view in FIG. 1 to illustrate certain internal details and/or configuration of the machine 100.

The machine 100 may include ground-engaging members 104, an operator cabin 106, a dump body 108, and a space frame assembly 110. The ground-engaging members 104 may include a set of front wheels 120 and a set of rear wheels 122. In some embodiments, the ground-engaging members 104 may include crawler tracks (not shown) provided either alone or in combination with the wheels 120, 122. The front wheels 120 and the rear wheels 122 may be powered by a propulsion system (not shown) of the machine 100 to propel and transport the machine 100 across an expanse of the worksite 102, according to a customary practice known in the art. The propulsion system may include one or more of an internal combustion engine or an electrical power source, such as a battery unit, to power one or more functions of the machine 100. Further, the dump body 108 may receive load for being transported from one location at the worksite 102 to another location at the worksite 102.

The operator cabin 106 may facilitate stationing of one or more operators therein, to monitor the operations of the machine 100. Also, the operator cabin 106 may house various components and controls of the machine 100, access to one or more of which may help the operators to control the machine's movement and/or operation. For example, the various components and controls of the machine 100 may include one or more of a steering wheel, touch screens, display devices, joysticks, switches etc., that may help an operator operate the machine 100.

Figure 2:
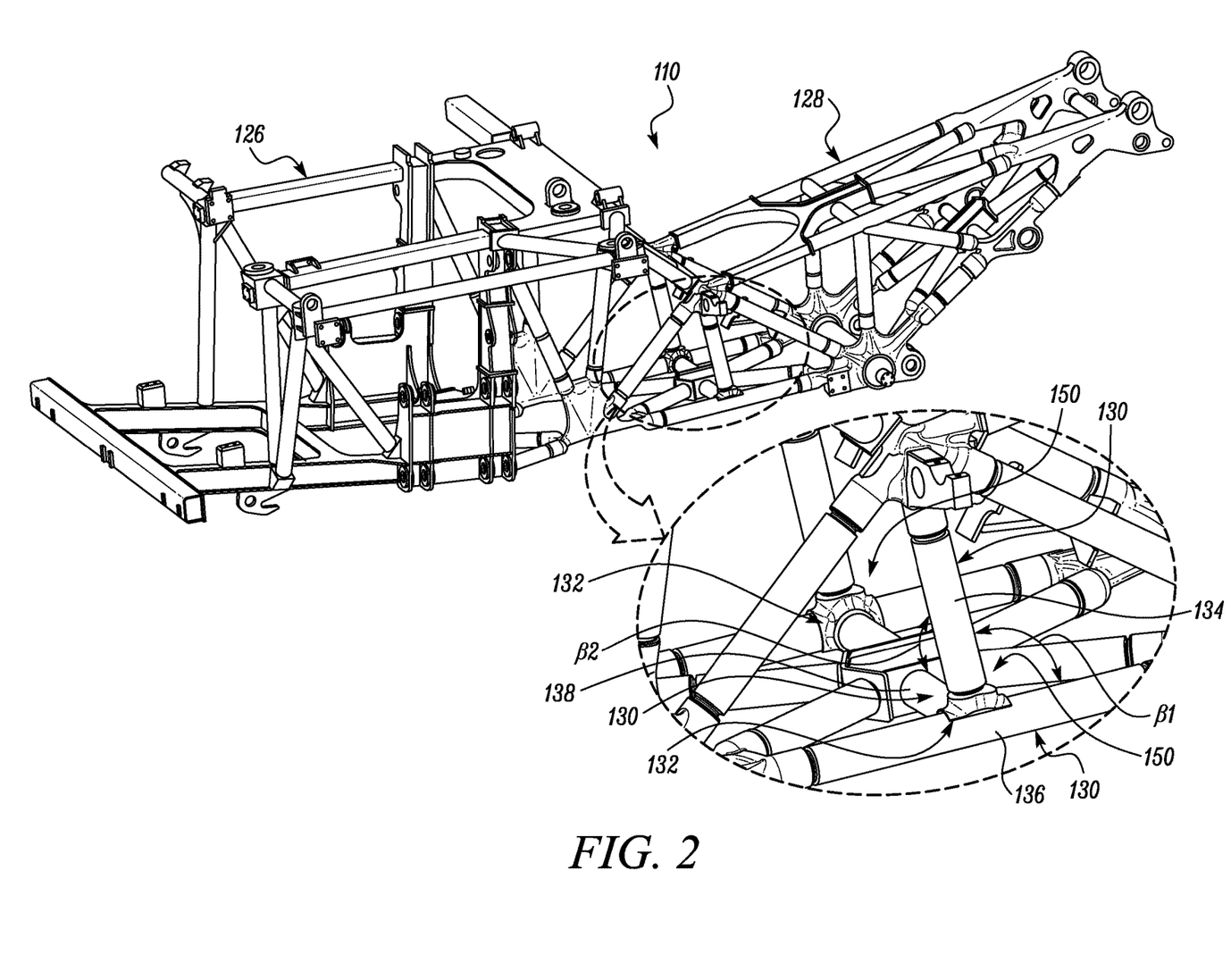
FIG. 2 illustrates the space frame assembly of the machine, in accordance with an embodiment of the present disclosure.

Referring to FIGS. 1 and 2, the space frame assembly 110 is shown. The space frame assembly 110 is supported over ground 'G' (of the worksite 102) by the ground-engaging members 104, i.e., the set of front wheels 120 and the set of rear wheels 122. The space frame assembly 110 is configured to support the propulsion system, the operator cabin 106, and the dump body 108 of the machine 100, although other components and structures of the machine 100 may be supported by the space frame assembly 110, as well. For example, the space frame assembly 110 defines a front frame portion 126 for supporting the operator cabin 106 and the propulsion system of the machine 100, and a rear frame portion 128 for supporting the dump body 108 of the machine 100.

The space frame assembly 110 includes multiple frame members 130 and at least one connector (for example, a connector 132) for interconnecting the frame members 130 (e.g., two or more frame members 130 to each other). The frame members 130 may be oriented in various angular positions and configurations with respect to one or more adjacent frame members 130. The configuration of the frame members 130, as may be defined with respect to each other, may be based on a desired load bearing capacity of the space frame assembly 110 (i.e., a permissible load that the space frame assembly 110 may take or carry). For example, the space frame assembly 110 may define a junction (see frame junction 150) between two or more frame members 130. For instance, a frame member 134 of the frame members 130, at the frame junction 150, may be inclined at a first angle 'β1' with respect to a first frame member 136 of the one or more other frame members 130, and may be further inclined at a second angle 'β2' with respect to a second frame member 138 of the one or more other frame members 130.

The frame members 130 may include elongate struts with any suitable cross-sectional shape, as viewed when each frame member 130 is dissected by a plane perpendicular to the elongation of the frame member 130. For example, the frame members 130 may have a closed cross-sectional shape, such as a circular cross-sectional shape, a square cross-sectional shape, an oval or elliptical cross-sectional shape, a hexagonal cross-sectional shape, or any irregular cross-sectional shape. In another example, the frame members 130 may have an open cross-sectional shape, to define one or more of a C-channel, I-beam, or an angular shape. In an embodiment, the frame members 130 may be linear frame members, each defining a linear longitudinal axis. In some embodiments, the frame members 130 may be curved frame members, each defining an arcuate longitudinal axis.

Figure 4:
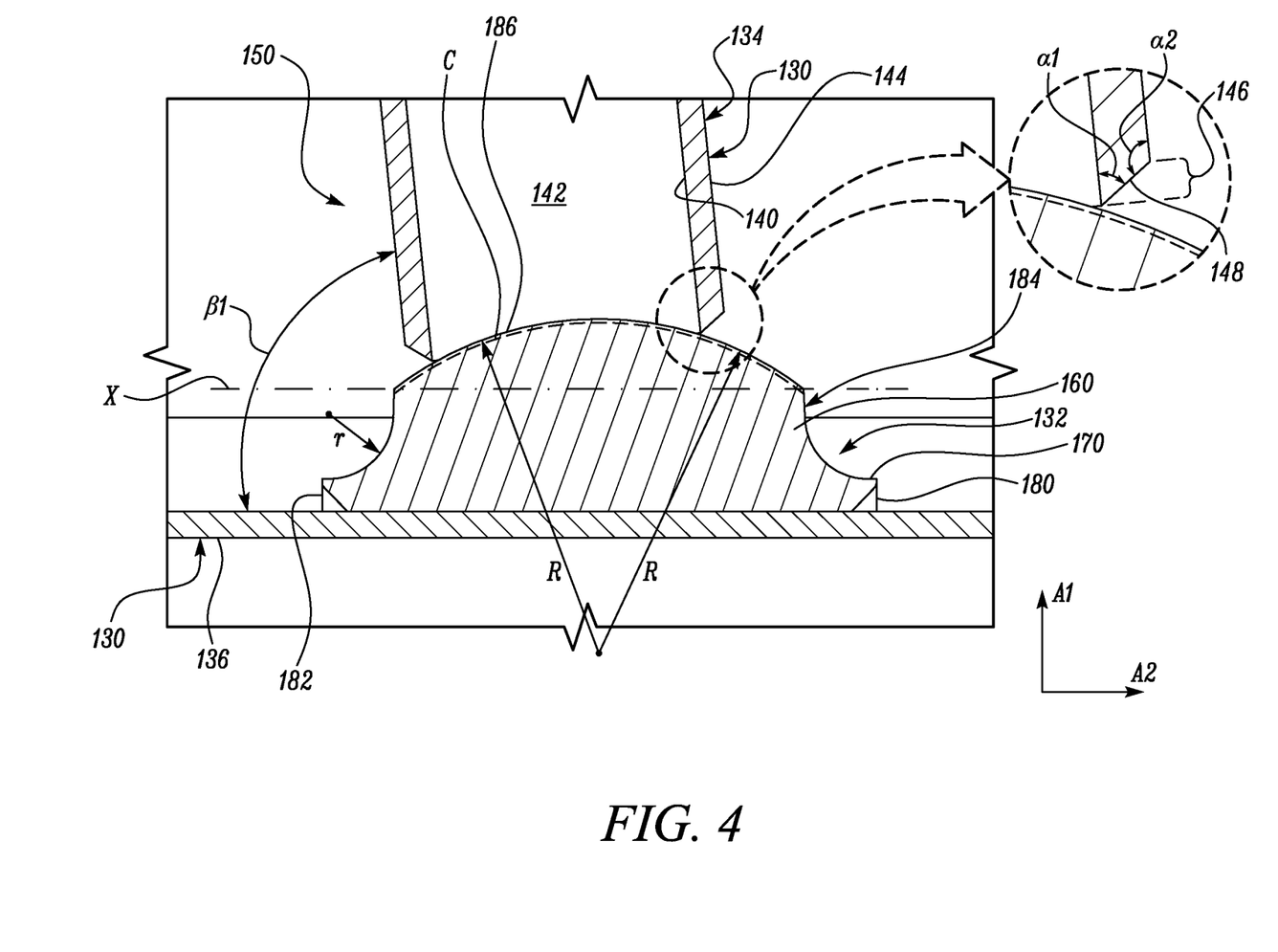
FIG. 4 illustrates a cross-sectional view of a frame junction formed between the connector and a frame member of the space frame assembly, in accordance with an embodiment of the present disclosure.

Referring to FIGS. 2 and 4, the frame member 134 is now discussed. The frame member 134 may include one or more or all of the characteristics discussed for the frame members 130 above. For example, the frame member 134 may be a hollow, elongated cylindrical pipe-shaped strut defining a circular cross-section shape when dissected by a plane perpendicular to the elongation or a central longitudinal axis 1' of the frame member 134. Other characteristics of the frame member 134 may be contemplated according to one or more of the features of the frame members 130, discussed above.

The frame member 134 may define an inner wall 140, an inner cavity 142, and an outer wall 144. Also, the frame member 134 may define an end 146. The end 146 may define a beveled surface 148 that may extend inwardly and tapered from the outer wall 144 towards the inner wall 140 of the frame member 134. In that manner, the beveled surface 148 may define a first included angle 'α1' with respect to the inner wall 140 of the frame member 134, and may further define a second included angle 'α2' with respect to the outer wall 144 of the frame member 134. The second included angle 'α2' may be larger than the first included angle 'α1'. The first frame member 136 and the second frame member 138 may include one or more features of the frame member 134, and hence will not be discussed.

Figure 3:
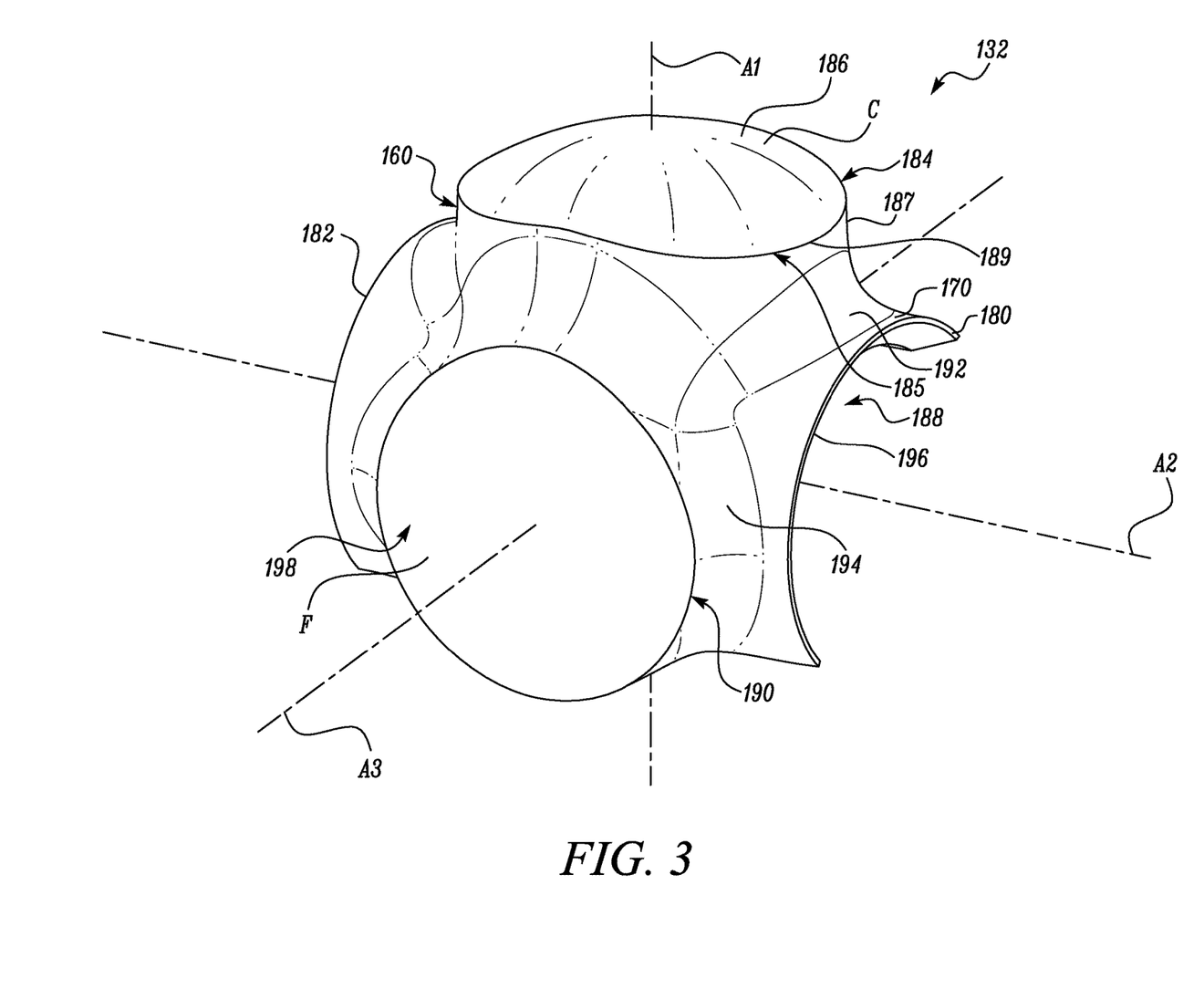
FIG. 3 illustrates a perspective view of a connector of the space frame assembly, in accordance with an embodiment of the present disclosure.

Referring to FIGS. 2, 3, and 4, the connector 132 is now discussed. The connector 132 is configured and/or applied to connect the frame member 134 to the one or more other frame members (i.e., to the first frame member 136 and the second frame member 138) to form the frame junction 150, as indicated above.

The connector 132 includes a body 160 defining a main axis 'A1', a longitudinal axis 'A2' transverse to the main axis 'A1', and a lateral axis 'A3' transverse to both the main axis 'A1' and the longitudinal axis 'A2'. The body 160 defines a surface 170 extending generally along the longitudinal axis 'A2' and terminating at opposite ends 180, 182. Further, the body 160 defines a projection 184 extending outwardly from the surface 170 along the main axis 'A1' of the body 160. The projection 184 extends outwardly from the surface 170 to define an axial end surface 186 (hereinafter referred to as "first axial end surface 186") away or remote from the surface 170.

The first axial end surface 186 defines a curvature 'C' having continuity (e.g., curvature continuity G2) across an expanse or entirety of the first axial end surface 186. For example, the curvature 'C' may define a constant radius of curvature 'R' when viewing a cross-section of the first axial end surface 186 in or on a plane passing through the axes A1, A2 (please see FIG. 4); and/or the curvature 'C' is in the form of a circular arc defining a smooth, continuous, and uninterrupted profile of the first axial end surface 186 at an end 185 of the projection 184 defined away from the surface 170 (please see FIG. 3). In some embodiments, the first axial end surface 186 is fully in the form of a spherical dome, i.e., a three-dimensional spherical shape cut-off by a plane 'X' (please see FIG. 4). In some embodiments, the first axial end surface 186, at least in part, is in the form of a spherical dome. In some embodiments, the first axial end surface 186 may be shaped to take the form of a hemisphere or may be shaped to take a form that is less or more than a hemisphere.

Further, the projection 184 defines an end 185, a lateral surface 187 along the main axis 'A1', and a closed edge 189 located around the main axis 'A1' between the lateral surface 187 and the first axial end surface 186. In other words, the closed edge 189 may be defined at an interface where the projection 184 transitions from its extension along the main axis 'A1' to the first axial end surface 186 at the end 185. As may be noted, the first axial end surface 186 may be (e.g., fully and/or entirely) defined within the closed edge 189.

Continuing with FIG. 3, the body 160 may define a receptacle 188, a protrusion 190, a first fillet surface 192, and a second fillet surface 194. The receptacle 188 may be in the form of a longitudinal cavity extending between the opposite ends 180, 182, along the longitudinal axis 'A2' of the body 160. The receptacle 188 may be configured to receive and fit over and around the first frame member 136. The receptacle 188 may define a geometry corresponding to the shape of the first frame member 136. For example, the receptacle 188 may define a linear semi-cylindrical geometry to receive and fit over and around the linear first frame member 136 of cylindrical shape. To receive the first frame member 136 into the receptacle 188, the receptacle 188 may define a mouth 196 that extends along the longitudinal axis 'A2' between the opposite ends 180, 182, of the body 160. In case the first frame member 136 includes a curved frame member defining an arcuate longitudinal axis, the receptacle 188 and the mouth 196 may define a correspondingly curved geometry as well (e.g., a geometry having an arcuate longitudinal axis) so as to receive and fit over and around the curved, first frame member 136.

The protrusion 190 may extend outwardly from the surface 170 along the lateral axis 'A3' of the body 160. The protrusion 190 may define a second axial end surface 198 away and remote from the surface 170. The second axial end surface 198 may define a flat face 'F' that may extend parallel to the plane passing through the axes A1, A2. The flat face 'F' may be configured to be coupled or engaged with an end of the second frame member 138. In some embodiments, the second axial end surface 198 may be similar to the first axial end surface 186.

The first fillet surface 192 may be defined between the surface 170 and the projection 184. The first fillet surface 192 may be a concave fillet surface. The first fillet surface 192 may have a constant radius of curvature 'r' (please see FIG. 4). In other embodiments, the first fillet surface 192 may have a variable radius of curvature. Similarly, the second fillet surface 194 may be defined between the surface 170 and the protrusion 190. The second fillet surface 194 may be a concave fillet surface. Similar to the first fillet surface 192, the second fillet surface 194 may have a constant radius of curvature (not shown). In other embodiments, the second fillet surface 194 may have a variable radius of curvature.

Figure 6:
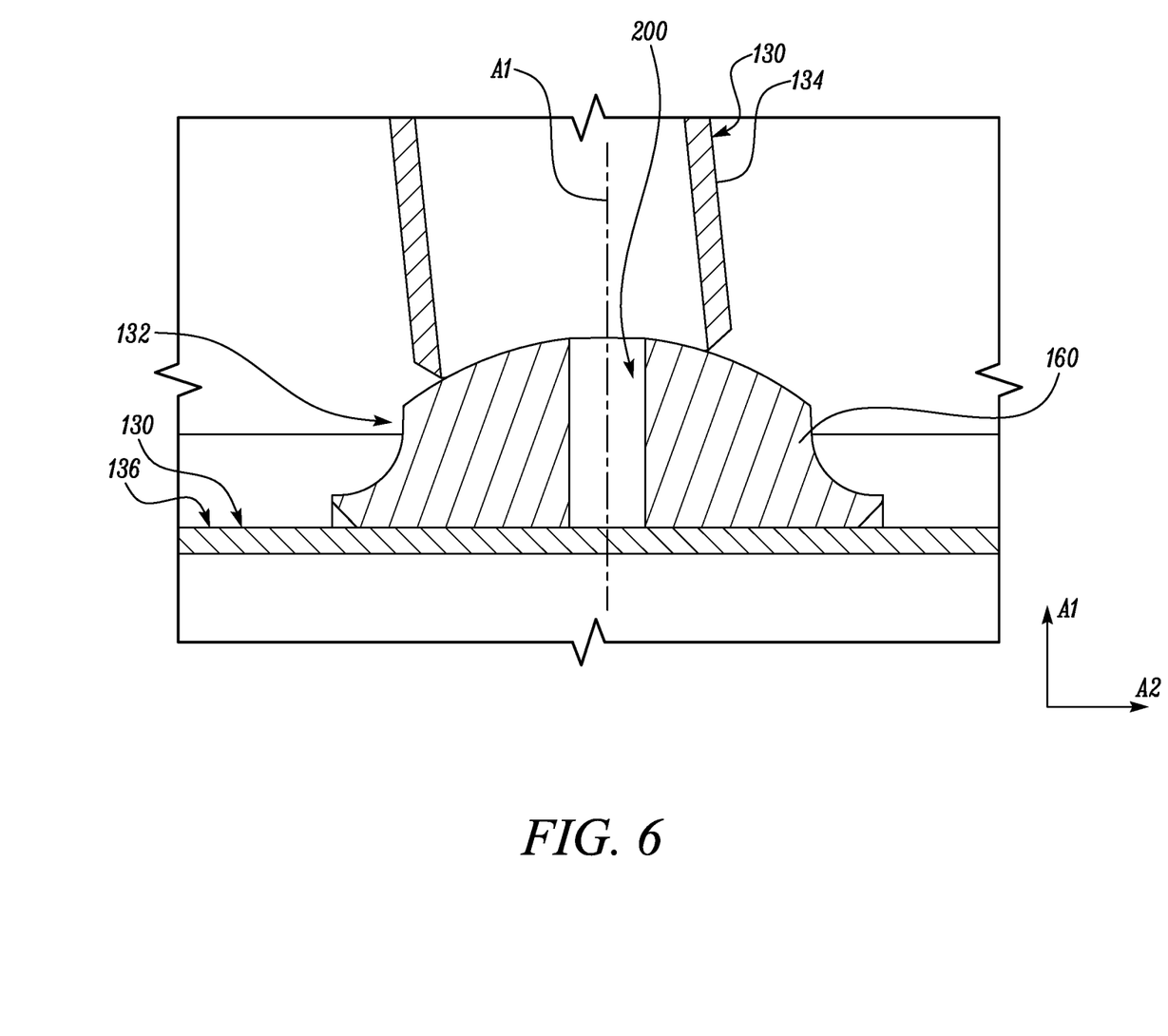
FIG. 6 illustrates a cross-sectional view of the connector with a through-bore, in accordance with an embodiment of the present disclosure.

Referring to FIG. 6, the body 160 of the connector 132 may additionally or optionally include a through-bore 200. Although not limited, the through-bore 200 may extend along the main axis 'A1' of the body 160 and may communicate with the receptacle 188. The through-bore 200 may be provided in the body 160 for achieving an overall weight reduction of the connector 132 and the space frame assembly 110. A size and/or dimension of the through-bore 200 may depend upon the connector 132's material properties and various structural characteristics and thus may vary from application to application. Moreover, the body 160 may include a monolithic construction (e.g., may include an integral, unitary construction and may be formed by casting material into the same mold). The body 160 may be composed of a metallic material, or a non-metallic material, or a combination thereof. The body 160 may be fabricated by way of casting, forging, extruding, machining, additive manufacturing, and/or by any combination of these manufacturing operations.

Figure 7:
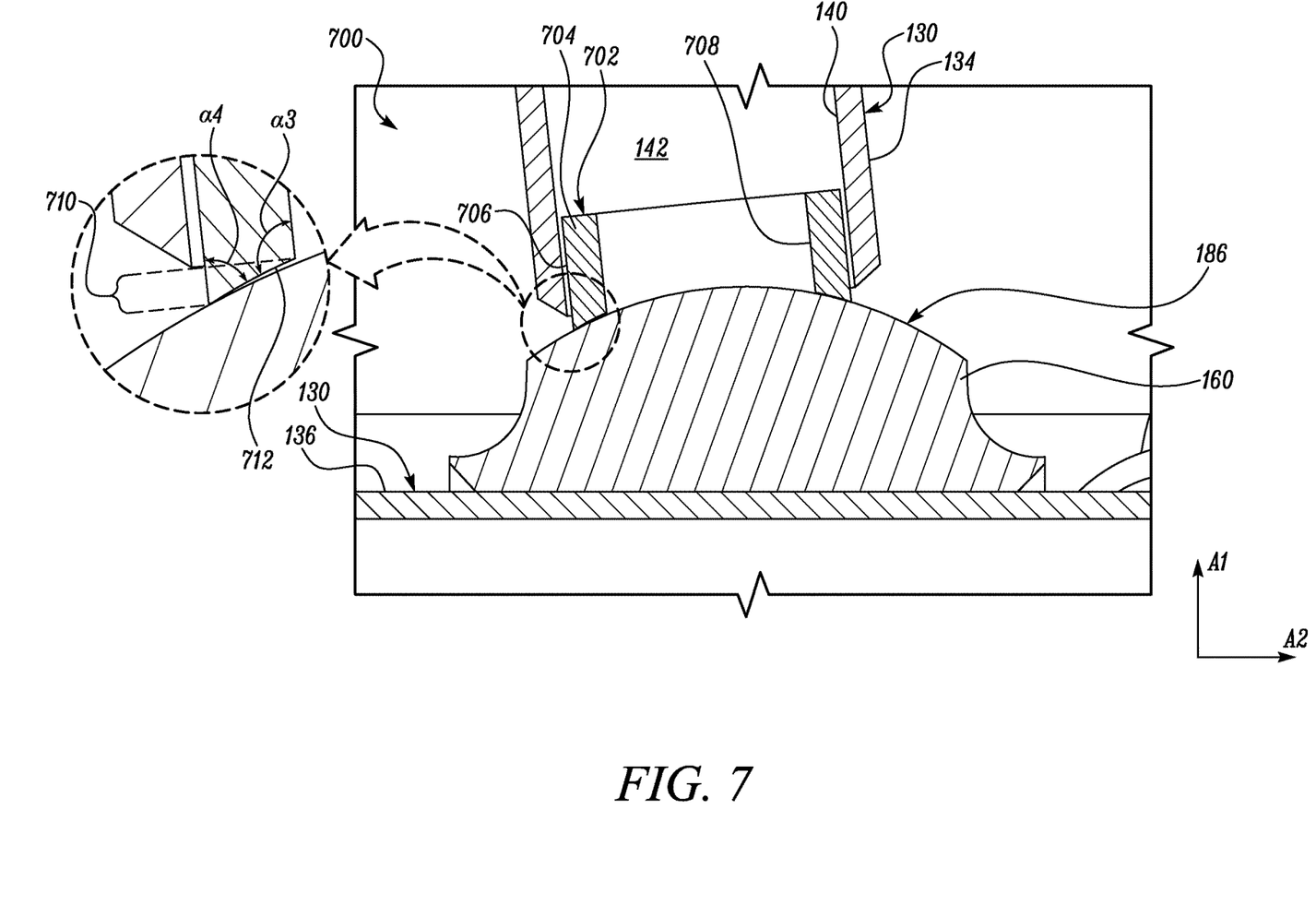
FIG. 7 illustrates a cross-sectional view of a frame junction having an adapter arranged between the connector and the frame member, in accordance with another embodiment of the present disclosure.

Referring to FIG. 7, a frame junction 700 of the space frame assembly 110 similar to the frame junction 150 is shown. As shown in FIG. 7, the space frame assembly 110 includes an adapter 702 arranged between the frame member 134 and the connector 132 to form the frame junction 700. For convenience, similar reference numerals have been used for the frame junction 700 as have been used for the frame junction 150, but with the exception that the adapter 702 and discussions associated thereof may use different reference numerals to highlight one or more aspects related to the adapter 702 and its assembly and use with the frame member 134 and the connector 132.

The adapter 702 may include an annular body 704 having an outer surface 706, an inner surface 708, and a leg 710. The leg 710 may define a chamfered surface 712 that extends outwardly and tapered from the inner surface 708 towards the outer surface 706, such that a third included angle 'α3' defined between the chamfered surface 712 and the inner surface 708 is larger than a fourth included angle 'α4' defined between the chamfered surface 712 and the outer surface 706. In other embodiments, the leg 710 may define a geometry that, at least in part, conforms to the curvature 'C' of the first axial end surface 186 to suitably engage with the first axial end surface 186 of the projection 184.

The adapter 702 is configured to be inserted into the inner cavity 142 of the frame member 134, such that the outer surface 706 of the adapter 702 may form a slidable fit with the inner wall 140 of the frame member 134. The adapter 702 may be partially inserted into the inner cavity 142 of the frame member 134 from the end 146 of the frame member 134. Also, the adapter 702 is configured to move and be positioned over the first axial end surface 186 of the projection 184, e.g., by way of swiveling, gliding, sliding, rotating, tilting, pivoting, and/or the like, prior to welding.

INDUSTRIAL APPLICABILITY

An exemplary method of interconnecting the frame member 134, the first frame member 136, and the second frame member 138, via the connector 132 to form the frame junction 150 of the space frame assembly 110 is now discussed. Initially, the first frame member 136 may be coupled to the connector 132. For that, the receptacle 188 of the connector 132 may be fitted around the first frame member 136 and welded to the first frame member 136.

Further, the frame member 134 (or the end 146 of the frame member 134) may be brought into abutment with the first axial end surface 186 of the connector 132 and moved over the first axial end surface 186 of the connector 132 to position the frame member 134 at the desired angle with respect to the main axis 'A1' of the body 160 of the connector 132. The curvature 'C' of the first axial end surface 186 facilitates the movement of the frame member 134 over the first axial end surface 186. For example, the frame member 134 may move over the first axial end surface 186 between a first angular position 'P1' relative to the main axis 'A1' (shown in solid line in FIG. 5) and a second angular position 'P2' relative to the main axis 'A1' (shown in dotted line in FIG. 5). The angular positions 'P1' and 'P2' and/or a region of contact between the frame member 134 and the first axial end surface 186 may be defined anywhere within the closed edge 189 of the projection 184.

Figure 5:
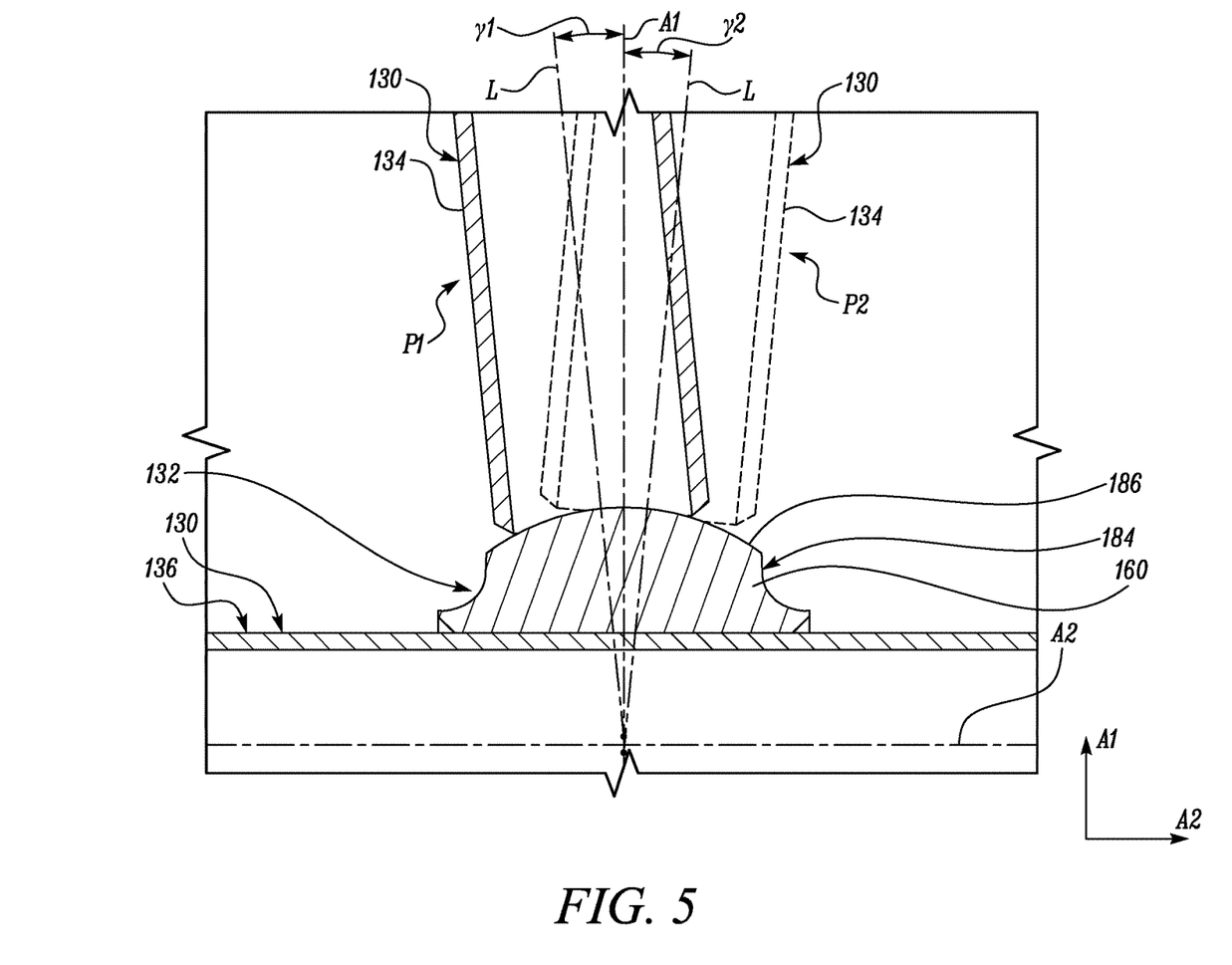
FIG. 5 illustrates a cross-sectional view of the frame member and its ability to be oriented at different angular positions over the connector, in accordance with an embodiment of the present disclosure.

In that manner, the frame member 134 may slide over the first axial end surface 186 to rotate, tilt, or pivot the frame member 134 between the first angular position 'P1' and the second angular position 'P2'. At the first angular position 'P1', the central longitudinal axis 1' of the frame member 134 is inclined at a primary angle 'γ1' with respect to the main axis 'A1' of the body 160, and at the second angular position 'P2', the central longitudinal axis 1' of the frame member 134 is inclined at a secondary angle 'γ2' with respect to the main axis 'A1'. The primary angle 'γ1' and the secondary angle 'γ2' may be an acute angle.

Once the frame member 134 is positioned over the first axial end surface 186 at the desired angle with respect to the main axis 'A1', a full penetration weld joint may be formed between the end 146 of the frame member 134 and the first axial end surface 186 of the connector 132, for example via welding. Subsequently, the second frame member 138 may be coupled to the connector 132. For that, the second frame member 138 may be positioned over the second axial end surface 198 of the protrusion 190 of the connector 132 and welded to the connector 132.

An exemplary method of interconnecting the frame member 134, the first frame member 136, the second frame member 138, via the connector 132 and the adapter 702, to form the frame junction 700 of the space frame assembly 110 is now discussed. The method of forming the frame junction 700 may be similar in all respects to the method of forming the frame junction 150 discussed above, but may differ in that the adapter 702 is inserted (e.g., partially inserted) into the inner cavity 142 of the frame member 134 from the end 146, prior to connecting by welding the frame member 134 with the connector 132.

The adapter 702 may be brought into abutment with the first axial end surface 186 of the connector 132 and move over the first axial end surface 186 of the connector 132 to position the frame member 134 at the desired angle with respect to the main axis 'A1' of the body 160 of the connector 132. Once the adapter 702 and the frame member 134 are positioned over the first axial end surface 186, a full penetration weld joint may be formed between the end 146 of the frame member 134, the adapter 702 (or the outer surface 706), and the first axial end surface 186 of the projection 184. When disposed between the frame member 134 and the first axial end surface 186, the adapter 702 may allow the frame member 134 to slide against the outer surface 706, and hence vary the size of the full penetration weld joint to be formed between the end 146 of the frame member 134, the adapter 702 (or the outer surface 706), and the first axial end surface 186 of the projection 184.

The connector 132 (and/or the space frame assembly 110) may be used in any machine such as off-highway mining or quarry trucks. The connector 132 may facilitate a frame member (such as the frame member 134) to incline at different angular positions with respect to adjacent one or more frame members (such as the first frame member 136 and the second frame member 138) prior to form a frame junction therebetween (such as the frame junction 150 or 700), thereby improving the alignment of the frame members in the space frame assembly 110 and reducing stress concentration at the frame junction and distortions in the weld.

Additionally, the connector 132 may facilitate the formation of the full penetration weld joint between the frame member 134 and the connector 132, thereby enhancing the strength and the load bearing capacity of the space frame assembly 110. Also, the connector 132 may be utilized to interconnect the frame members 130 located at any location (or multiple sides, e.g., the left-hand side or the right-hand side) of the machine 100.

Further, the connector 132 (and/or the space frame assembly 110) may provide additional advantages associated with the manufacture of machine 100. For example, the simple and easy-to-use construction of the connector 132 may allow quick assembly or disassembly of the frame members 130 with the connector 132, thereby reducing the time of manufacturing and/or maintenance of the machine 100.

It will be apparent to those skilled in the art that various modifications and variations can be made to the method/process of the present disclosure without departing from the scope of the disclosure. Other embodiments will be apparent to those skilled in the art from consideration of the specification and practice of the method/process disclosed herein. It is intended that the specification and examples be considered as exemplary only, with a true scope of the disclosure being indicated by the following claims and their equivalent.

What is claimed is:

1. A space frame assembly for a machine, the space frame assembly comprising:
    a plurality of frame members; and
    a connector to connect a frame member of the plurality of frame members to one or more other frame members of the plurality of frame members, the connector including:
        a body defining a surface and a projection extending outwardly from the surface along a main axis to define an axial end surface away from the surface, wherein the axial end surface defines a curvature having continuity across an expanse of the axial end surface to facilitate formation of a full penetration weld joint between an end of the frame member and the axial end surface upon a contact of the end of the frame member with the axial end surface,
        wherein the frame member defines an inner wall, an inner cavity, and an outer wall, wherein the end of the frame member defines a beveled surface extending inwardly and tapering from the outer wall towards the inner wall, the beveled surface defining a first included angle with respect to the inner wall and a second included angle with respect to the outer wall, and wherein the second included angle is larger than the first included angle.

2. The space frame assembly of claim 1, further comprising:
    an adapter positioned over the axial end surface of the projection and inserted into the inner cavity of the frame member, wherein the full penetration weld joint is configured to be formed between the end of the frame member, the adapter, and the axial end surface of the projection.

* * * * *